(12) United States Patent
Bianco

(10) Patent No.: US 9,090,175 B2
(45) Date of Patent: Jul. 28, 2015

(54) POWER SHARE SYSTEM FOR ELECTRIC VEHICLE SERVICE EQUIPMENT

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 819 days.

(21) Appl. No.: 13/409,570

(22) Filed: Mar. 1, 2012

(65) Prior Publication Data

US 2012/0223675 A1  Sep. 6, 2012

Related U.S. Application Data

(60) Provisional application No. 61/447,901, filed on Mar. 1, 2011.

(51) Int. Cl.
*H02J 7/00* (2006.01)
*B60L 11/18* (2006.01)
*H02J 3/14* (2006.01)

(52) U.S. Cl.
CPC .............. *B60L 11/1844* (2013.01); *H02J 3/14* (2013.01); *Y02B 70/3225* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 20/222* (2013.01); *Y04S 30/12* (2013.01)

(58) Field of Classification Search
CPC ...... H02J 3/14; Y02T 90/128; Y02B 70/3225
USPC ......................................... 320/104, 109, 157
See application file for complete search history.

(56) References Cited

U.S. PATENT DOCUMENTS 5,548,200 A * 8/1996 Nor et al. ...................... 320/109
2011/0175569 A1* 7/2011 Austin .......................... 320/109

* cited by examiner

*Primary Examiner* — Edward Tso
*Assistant Examiner* — Aaron Piggush
(74) *Attorney, Agent, or Firm* — Alix, Yale & Ristas, LLP

(57) ABSTRACT

A power share module is employed to sense the power usage of an electric utility at a residence and to selectively provide power to an EVSE for charging an electric vehicle. If the power drawn by the utility such as an electric dryer or a range is above a certain threshold, power is not supplied to the EVSE. When power is less than the threshold, the power sharing module allows power to be supplied to the EVSE.

13 Claims, 9 Drawing Sheets

POWER SHARE SYSTEM FOR ELECTRIC VEHICLE SERVICE EQUIPMENT

CROSS-REFERENCE TO RELATED APPLICATION

This application claims the priority of U.S. Provisional Patent Application No. 61/447,901 filed on Mar. 1, 2011, the disclosure of which is incorporated herein by reference in its entirety.

BACKGROUND

This disclosure relates generally to devices and methods for supplying electric power to electric vehicle service equipment ("EVSE") for charging electric vehicles. More particularly, this disclosure relates to devices and methods for interfacing with an existing local power supply, such as the power supply to a residence, to provide sufficient electrical power for EVSE.

When a home owner purchases an electric vehicle, the owner will need to install EVSE to supply electrical power for charging the battery power unit of the electric vehicle. The EVSE installations must meet national and electrical codes. While most garages or carports are equipped with an electrical outlet that typically supplies 120V AC at 15 amps, this power is typically inadequate to charge in a reasonable time the newer vehicles with larger batteries. It is practically required to supply these vehicles with 220V AC at 30 to 50 amps. This is easily accomplished in newer homes with power lines and service panels having ratings of 200 amps or more. However, the large majority of older homes typically have 100 amp service panels with little or no spare capacity. Installing new service lines and larger panels is a costly, time consuming process raising the initial cost of owning an electric vehicle to the point where it may not be economically affordable.

Likewise, electric vehicle owners who reside in multi-unit dwellings must address the issue of available power for charging the vehicle battery supply. Preferably, sufficient power can be made available without the addition of power supply capacity.

One solution to the problem is for the EVSE and a household utility to share the same breaker in the existing load center. However, this is contrary to electrical codes because when both devices call for power at the same time, the breaker would trip.

To prevent this problem and comply with electrical codes, it is advantageous to automatically switch the electrical power between the two loads, the utility and EVSE, so that they are not drawing large amounts of power at the same time. The automatic switching is a realistic and practical solution since concurrent usage of the utility and EVSE for significant time periods is ordinarily not required.

SUMMARY

Briefly stated, a power sharing device of compact modular form comprises a first electrical input which connects with a service panel. A first electrical port connects with at least one household utility in electrical communication with said first electrical input. A second electrical port which connects with an EVSE is in selected electrical communication with said first electrical input via a relay. A current sensor senses the utility current through said first electrical port. A microprocessor responsive to the current sensor controls a relay to allow full power charging to the second electrical port when the utility current is below a threshold and transmits an output to reduce the power to the EVSE when the utility current exceeds the threshold. The microprocessor continuously monitors the utility current so that when the utility current decreases below the threshold and after a pre-established time delay, the relay is actuated to allow full power charging to the EVSE.

A control contact command is transmitted to the EVSE. In one embodiment, an electrical box houses the first electrical input, the first electrical port, the second electrical port, the current sensor and the microprocessor. The relay drives a line to neutral in the event that the utility line is drawing power in excess of the threshold amount. A plurality of LEDs indicates whether sufficient power is available for supply to the EVSE or is required for the utility. The service panel connects with the utility via a double pole breaker. In one preferred application, the utility is an electric range or an electric dryer. The service panel is connected downstream from a service meter.

A method for power sharing between a household utility and an EVSE comprises connecting the utility and the EVSE to a breaker unit of a panel, sensing the utility current drawn by the utility, and powering the EVSE at full power when the utility current is below a threshold. The power to the EVSE is automatically reduced when the utility current the threshold current. The utility current is continuously monitored. Full power is restored to the EVSE when the utility current decreases below threshold and a pre-established time delay interval has elapsed. A control contact command is transmitted to the EVSE. Signal pulse width modulation is employed to determine the level of current available for the EVSE.

A power sharing system for a multi-unit dwelling comprises a service meter for one unit. A unit service panel connects the service meter over a first line and a second line. A power share module connects the lines. A first electrical input connects with the service panel. A first electrical port connects with at least one household utility of said unit and is in electrical power communication with said first electrical input. A second electrical port connects with an EVSE and is in selective electrical power communication with said first electrical power input via a relay. A current sensor senses the utility current through the first electrical port. A microprocessor responsive to the current sensor controls the relay to allow full power charging to the second electrical port when the utility current is below a threshold and transmits an output to reduce the power to the EVSE ad when the utility current exceeds the threshold. The microprocessor continuously monitors the utility current so that when the utility current is below the threshold and after a pre-established time delay, the relay is actuated to allow full power charging to the EVSE. In one embodiment, the current is sensed by means of a current sense transformer.

DETAILED DESCRIPTION

Figure 1:
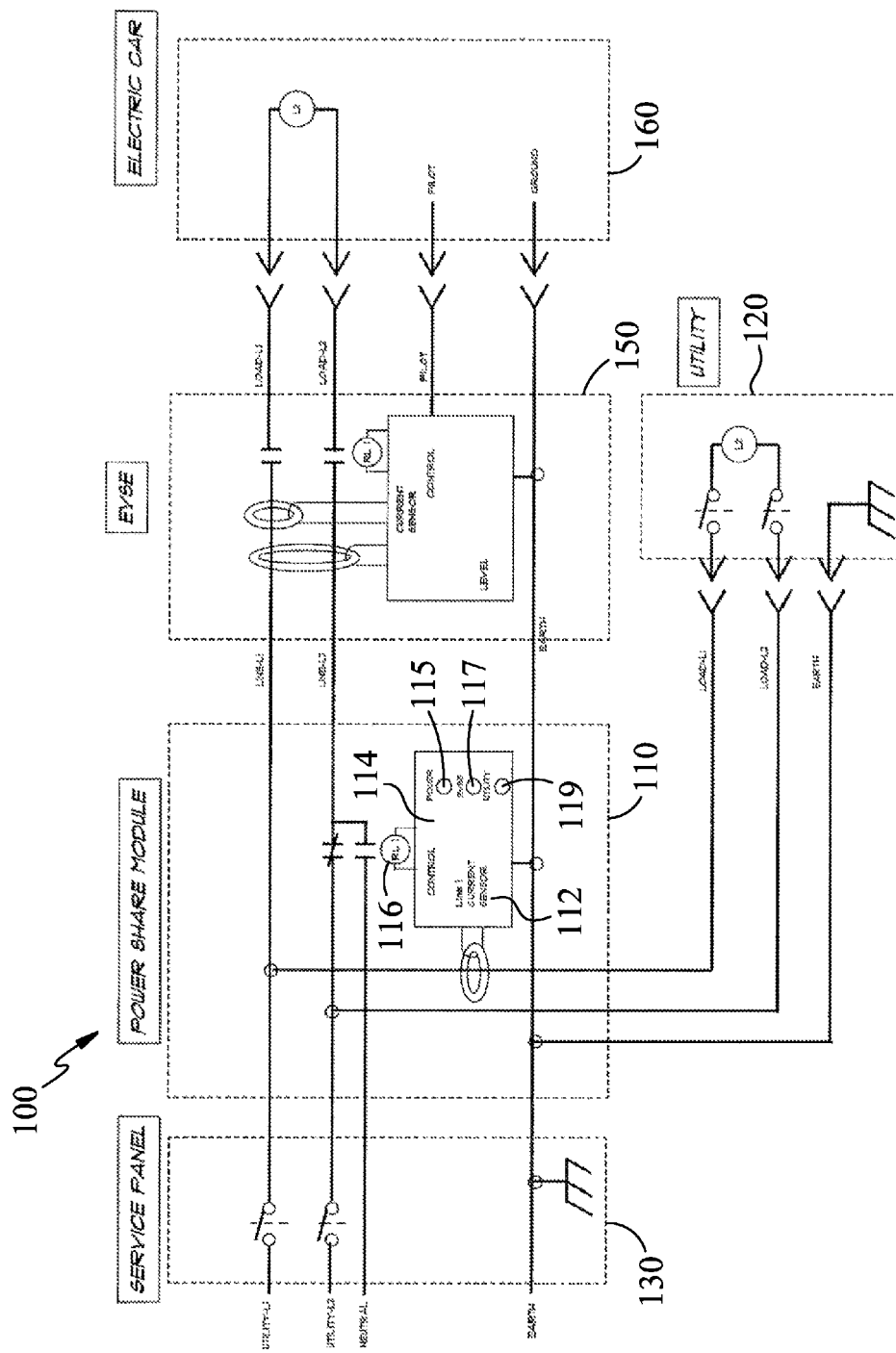
FIG. 1 is a block diagram of a power share system employed for a residential unit and adapted to supply power to an EVSE for charging an electric vehicle.
Figure 2:
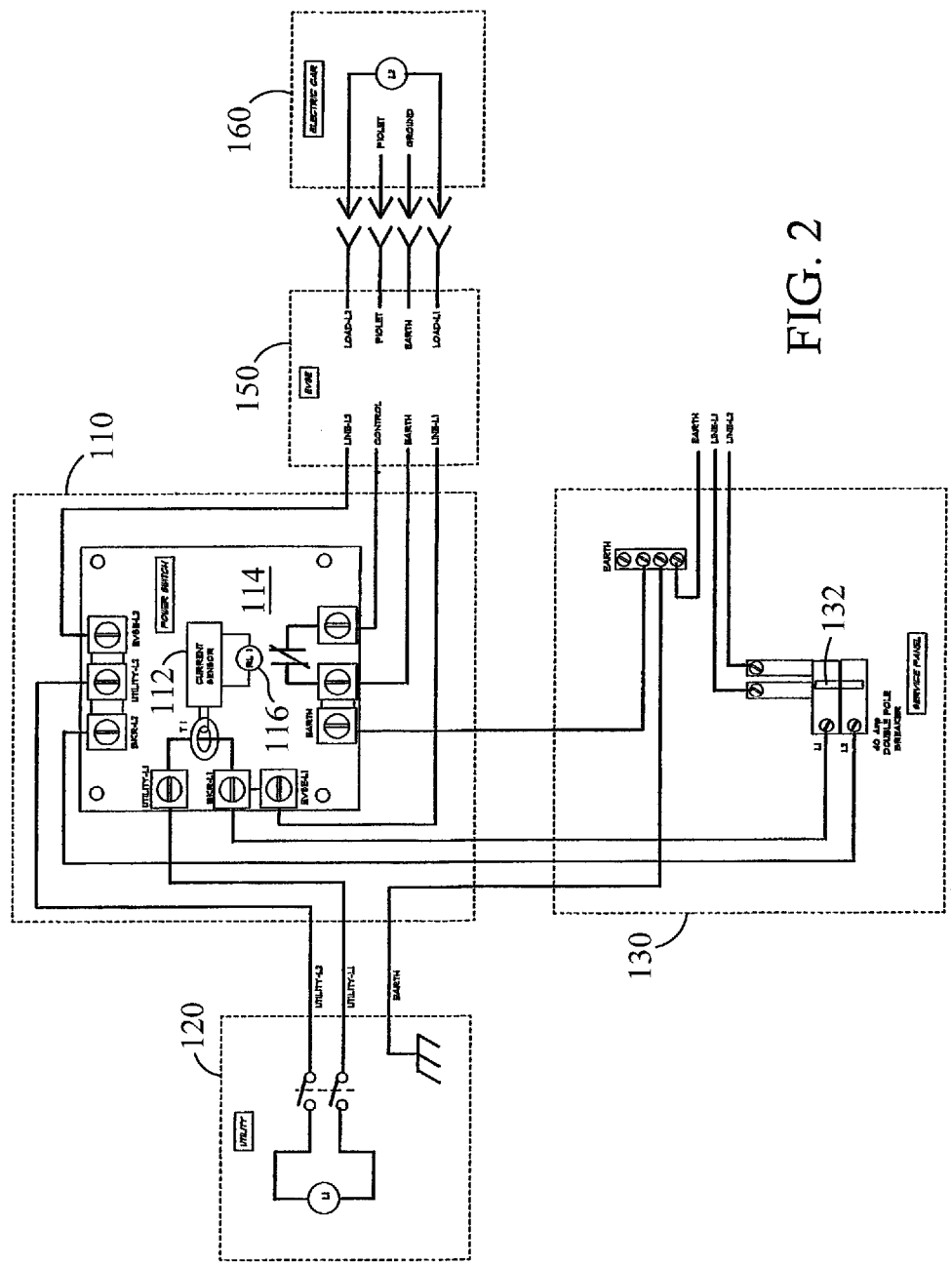
FIG. 2 is a wiring diagram for the power share system of FIG. 1.

With reference to the drawings wherein like numerals represent like parts throughout the Figures, a power share system designated generally by the numeral 100 in FIGS. 1 and 2 has particular applicability for a residential application, such as a single family residence. The power share system functions to allocate power to a wide variety of EVSE without the necessity of installing additional service capacity to the existing residence.

Figure 3:
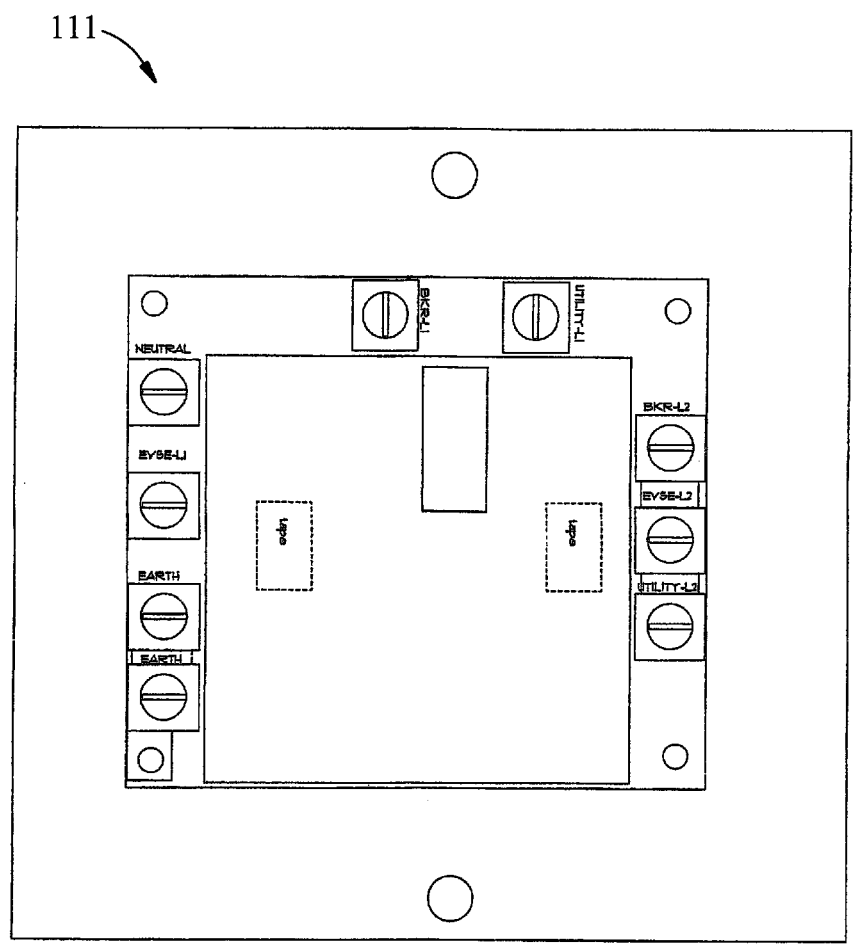
FIG. 3 is a front interior view, portions removed and partly in phantom, of a power share module for the power share system of FIG. 1 and annotated to show connection terminals.

The key component is a power share module 110 which is easily installed at the residence. The power share module 110 is employed to sense the residential power load (or a principal load component) and to direct power to an EVSE if there is sufficient power available. The EVSE for the application to which the power share system is adapted typically requires 40 amps. The power share module 110 may essentially be configured in the form of an electrical box 111 of FIG. 3. The electrical box 111 is easily installed and connected into the existing residential electrical system.

The power share module 110 in one embodiment is efficiently installed to interface with a single residential utility 120, which draws a significant load, such as, for example, an electric range or an electric clothes dryer. The power share module 110 also connects with the existing service panel 130 of the residence. The power share module 110 connects directly with the EVSE 150 which is ultimately connectable to the charging system of the electric vehicle 160.

The power share module 110 employs one current sensor 112 which continuously senses the current in line L1. The sensed input current is continuously processed by a microprocessor at a control board 114 which provides an output to control a relay R1 116. The relay 116 drives the line L2 to the neutral in the event that the utility 120 is drawing power in excess of a threshold amount. Accordingly, there is a small amount or no power supplied to the EVSE 150. The EVSE senses there is thus insufficient power for charging. When the current drawn by the utility 120 decreases below the threshold level, the relay 116 is actuated after a pre-established time delay to a position which allows power to be supplied to the EVSE 150 to ultimately supply power for charging the electric vehicle. The power share module has LEDs 115, 117 and 119 to indicate whether sufficient power is available for supply to the EVSE 150 or is required for the utility 112 (which takes precedence).

A generalized wiring diagram for the power sharing system 100 set forth in FIG. 2 indicates the line connections with the power share module 110. The service panel 130 electrically connects the utility 120 to which the EVSE power supply is keyed, and the power share module 110. Lines L1 and L2 connect the utility 40A via double pole breaker 132 at the service panel 130, connect the power sharing module 110 and also connect the EVSE 150. The current is continuously sensed on line L1 by the current sensor 112 to determine whether power is available for the EVSE 150. The line L2 is controlled by the relay 116 which is responsive to the current sensor 112 on the line. When the current load of the utility is below a threshold (for a pre-established time interval), the lines L1, L2 connect to supply power to the EVSE 150. In the event that the line L1 exceeds the threshold, the relay 116 terminates the power (or in some instances steps down the power) to the EVSE 150.

Figure 4:
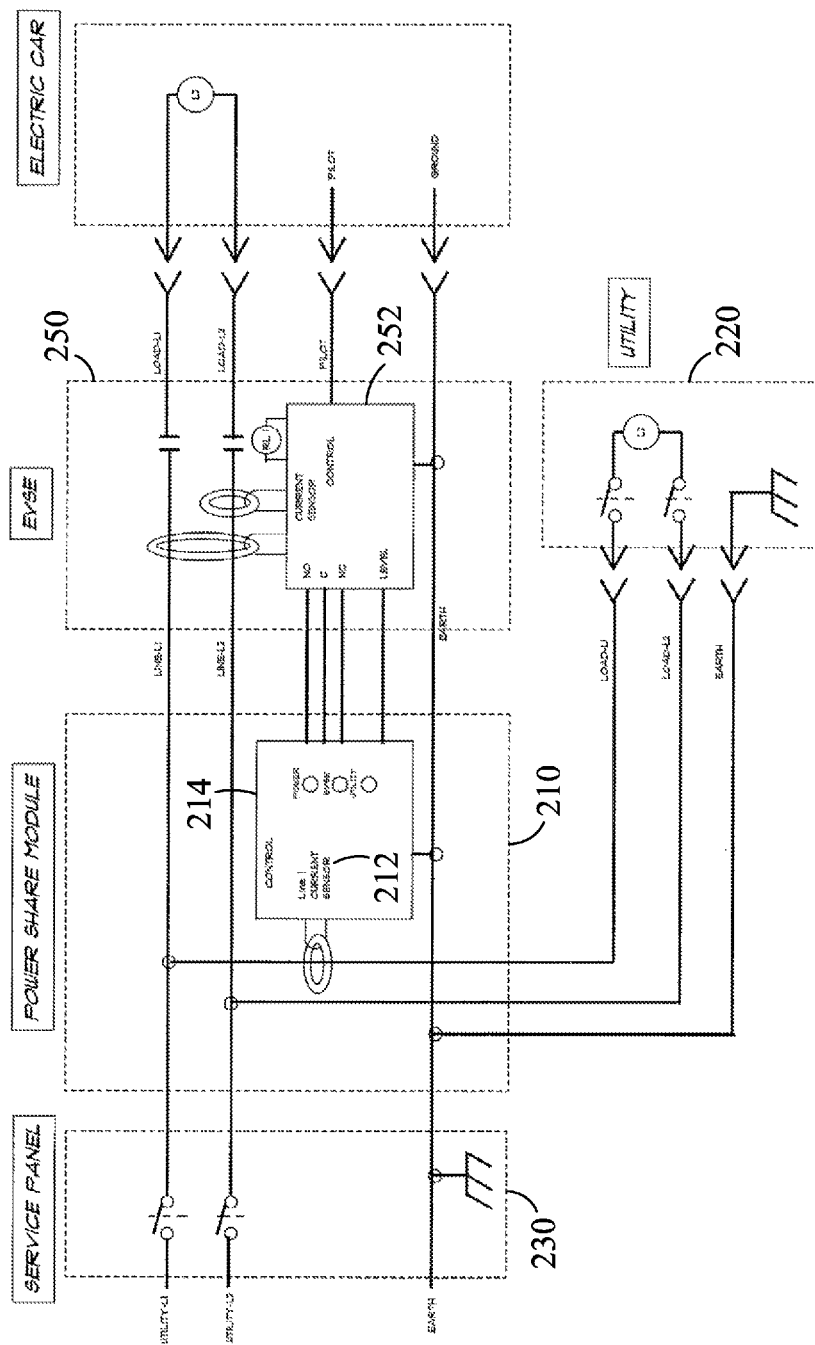
FIG. 4 is a block diagram of a second embodiment of a power share system employed for a residence and adapted to supply power to an EVSE for charging an electric vehicle.
Figure 5:
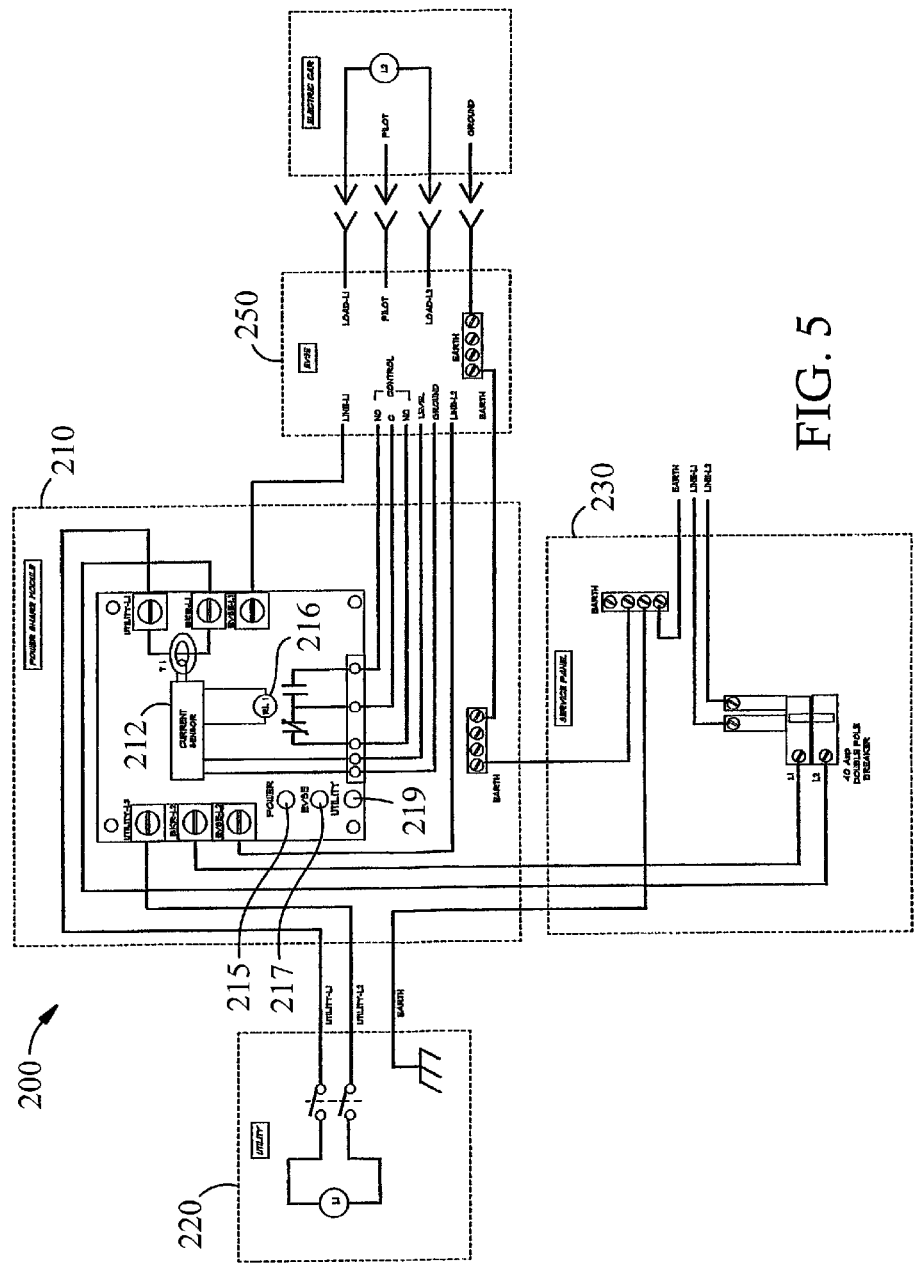
FIG. 5 is a wiring diagram for the residential power share system of FIG. 4.

Power sharing system 200, as illustrated in FIGS. 4 and 5 employs a second embodiment of a power share module 210. The power share module 210 is preferably configured in the form of an electrical box 211. The power share module 210 continuously senses the load level for a high load utility 220, such as a range or electric dryer, and transmits a contact control output to the EVSE 250 to control the operative state of the EVSE (and the power load).

The power share module 210 connects with the lines L1 and L2 which communicate with the service panel 230, with a high load utility 220 such is, for example, an electric range and with the EVSE 250. The power share module 210 includes a control board 214 with a line L1 current sensor 212. Current sensor 212 continuously senses the current in line L1 which is the load current for the test utility 220.

In the event that the load current of the utility exceeds a pre-determined threshold, the control board microprocessor 218 sends a closure control command to the control board 252 of the EVSE which controls the power supplied to the EVSE. The EVSE has a contact closure for effectively suspending the electric charging of electric vehicle 260 while there is insufficient available power. The microprocessor 218 also generates a current level output to the EVSE. In some instances, the EVSE is operable to charge at a reduced power level.

Figure 6:
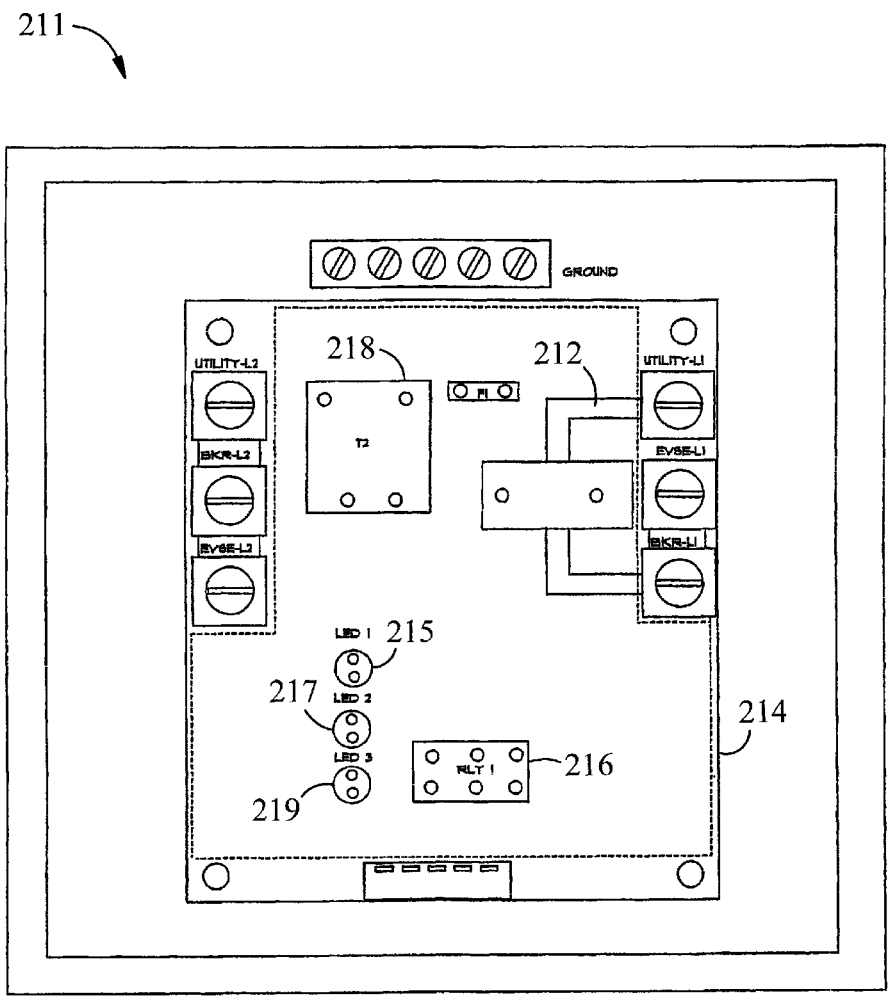
FIG. 6 is a front interior view, portions removed, of a power share module for the power share system of FIG. 4 and annotated to show connection terminals.

The wiring diagram for the power sharing system 200 illustrated in FIG. 5 indicates the external line connections with the power share module 210. A representative power share module box 211 is illustrated in FIG. 6 which shows the various connector terminals for the power share module. The module 210 also has LEDs 215, 217 and 219 which indicate the allocation of the power supply between the utility 220 and the EVSE 250.

Figure 7:
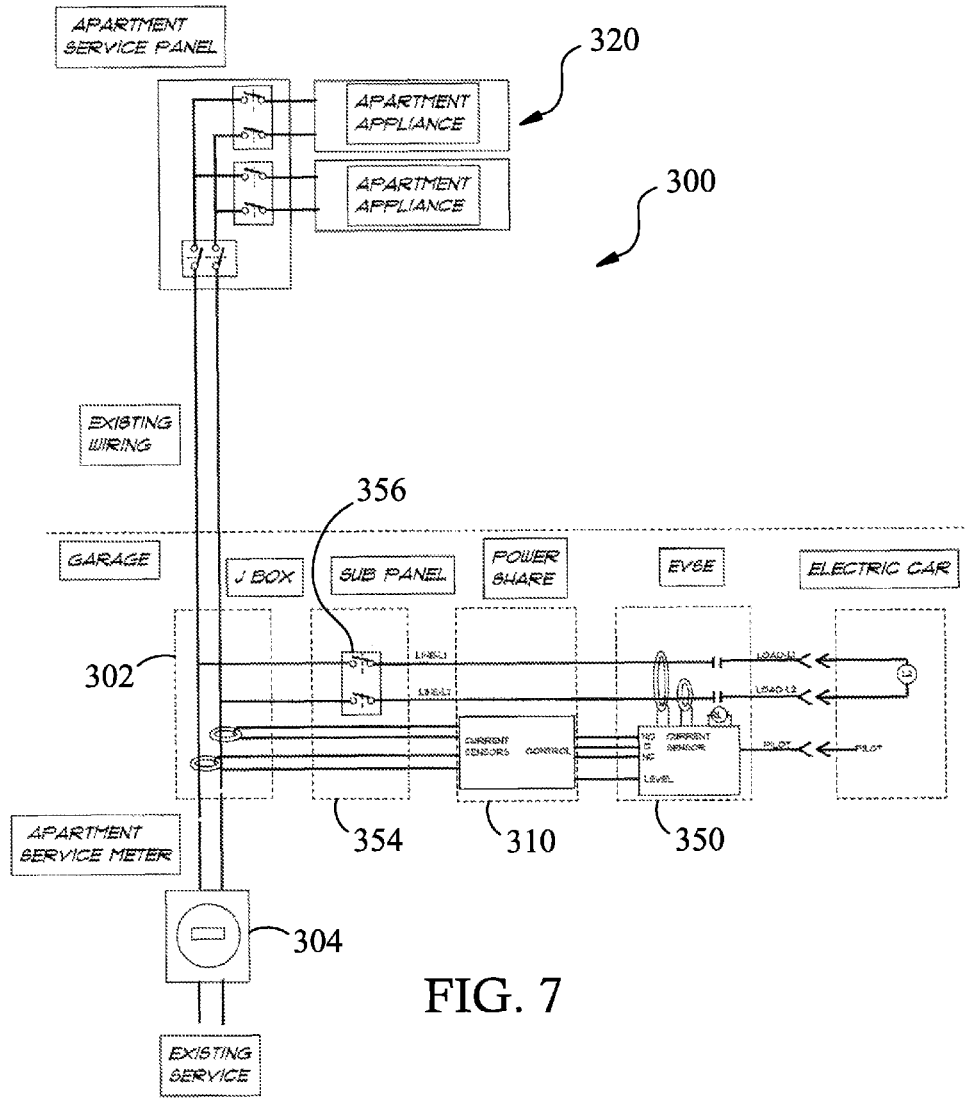
FIG. 7 is a power share system employed for a representative multi dwelling residence and adapted to supply power to EVSE for charging an electric vehicle.
Figure 8:
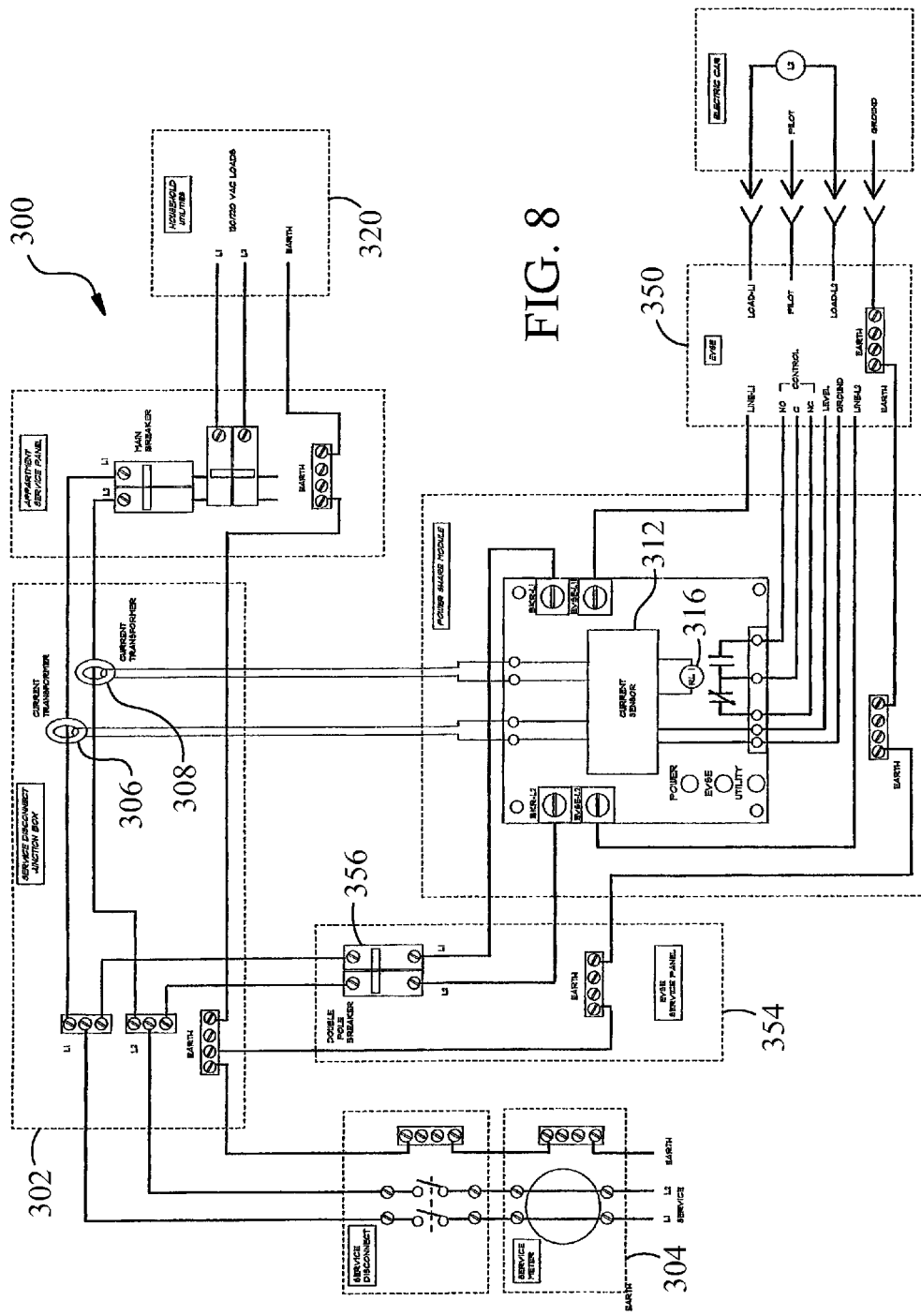
FIG. 8 is a block wiring diagram for the power share system of FIG. 7.
Figure 9:
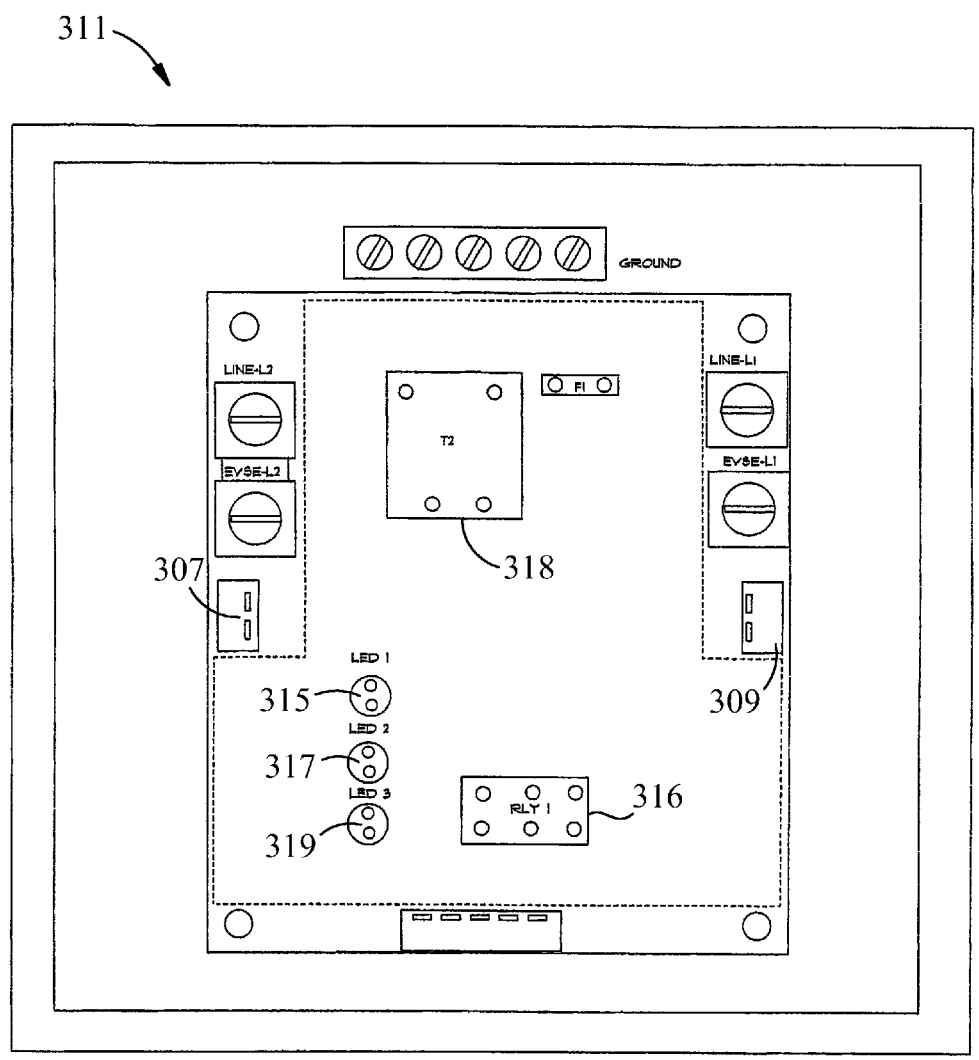
FIG. 9 is a front interior view, portions removed, of a power share module for the power share system of FIG. 7 and annotated to show connection terminals.

A power share system 300 for a multi-unit dwelling application, such as for an apartment building, is illustrated in FIGS. 7 and 8. A junction box 302 downstream from the apartment service meter 304 houses a pair of line sensor transformers 306 and 308 which continuously sense the current load in lines L1 and L2.

The power share module 310 includes a control board 314 with a current sensor 316 which receives inputs from transformers 306 and 308 that continuously measure the current for both lines L1 and L2. In power share system 300, multiple appliance loads are measured for the utilities 320.

The power share module 310 includes a microprocessor 318 which controls a relay 316 to generate a control signal to the EVSE. A closure control command is then sent to the EVSE as well as a current level. Signal pulse width modulation is employed to determine the current level available for EVSE so that the EVSE can determine the available power. A pulse rate differential is employed to generate the level control signal. If the utilities 320 are drawing power above a threshold level, the EVSE control will not allow the EVSE to draw significant power. There may be a power level when the EVSE can draw sufficient power at a reduced level to provide a low level charge to the electric vehicle.

A wiring diagram for the power share system 300 illustrated in FIG. 8, which is essentially for an apartment power sharing unit, indicates the various line connections. The circuit panel for the power sharing system 300 illustrated in FIG.

9 shows how the various lines connect with the module. The current sense transformers 306 and 308 connect via sockets 307 and 309.

The power share module 310 is preferably configured as an electrical box 311 mounted in the garage adjacent the EVSE 350. The junction box 302 and an EVSE breaker subpanel 354 with a double pole breaker 356 are also installed in the garage and connected downstream from the apartment service meter 304. The module includes LEDs 315, 317 and 319 for indicating the allocation of the apartment power supply.

Any of the power sharing modules may incorporate an eco-module which regulates the supply of power to the EVSE to favor certain low cost energy times of the day and prevent the supply of power when the energy cost is highest at peak demand times of the day.

In addition, the EVSE may generate a signal when charging is complete. The signal may be transmitted to the apartment to advise that charging is complete.

The invention claimed is:

1. A power sharing device comprising:
   a first electrical input which connects with a service panel;
   a first electrical port which connects with at least one household utility in electrical power communication with said first electrical input;
   a second electrical port which connects with an EVSE and is in selected electrical power communication with said first electrical input via a relay;
   a current sensor which senses the utility current through said first electrical port;
   a microprocessor responsive to the current sensor and which controls the relay to allow full power charging to the second electrical port when the utility current is below a threshold and transmits an output to reduce the power to the EVSE when the utility current exceeds the threshold and continuously monitors the utility current so that when said utility current decreases below the threshold after a pre-established time delay, the relay is actuated to allow full power charging to the EVSE.

2. The power sharing device of claim 1 wherein a control contact command is transmitted to the EVSE.

3. The power sharing device of claim 1 further comprising an electrical box housing said first electrical input, said first electrical port, said second electrical port said current sensor and said microprocessor.

4. The power sharing device of claim 1 wherein said relay drives a line to neutral in the event that the utility line is drawing power in excess of the threshold amount.

5. The power sharing device of claim 1 further comprising a plurality of LEDs to indicate whether sufficient power is available for supply to the EVSE or is required for the utility.

6. The power sharing device of claim 1 further comprising a service panel which connects with the utility via a double pole breaker.

7. The power sharing device of claim 1 wherein said utility is an electric range or an electric dryer.

8. The power sharing device of claim 1 further comprising a service meter and a service panel, said service panel being connected downstream from said service meter.

9. A method of power sharing between a household utility and an EVSE comprising:
   connecting the utility and the EVSE to a breaker unit of a panel;
   sensing the utility current drawn by the utility;
   powering the EVSE at full power when the utility current is below a threshold current;
   reducing the power to the EVSE when the utility current exceeds the threshold current;
   monitoring the utility current;
   restoring full power to the EVSE when the utility current is below the threshold current and a pre-established time delay interval has elapsed.

10. The power sharing method of claim 9 further comprising transmitting a control contact command to the EVSE.

11. The power sharing method of claim 9 further comprising employing signal pulse width modulation to determine a level of current available for the EVSE.

12. A power sharing system for a multi-unit dwelling comprising:
   a service meter for one unit;
   a unit service panel connecting said service meter over a first line and a second line;
   a power share module connecting said lines and comprising:
      a first electrical input which connects with the service panel;
      a first electrical port which connects with at least one household utility of said unit and is in electrical power communication with said first electrical input;
      a second electrical port which connects with an EVSE and is in selected electrical power communication with said first electrical input via a relay;
      a current sensor which senses the utility current through said first electrical port;
      a microprocessor responsive to the current sensor and which controls the relay to allow full power charging to the second electrical port when the utility current is below a threshold and transmits an output to reduce the power to the EVSE when the utility current exceeds the threshold and continuously monitors the utility current so that when said utility current decreases below the threshold after a pre-established time delay, the relay is actuated to allow full power charging to the EVSE.

13. The power sharing system of claim 12 wherein said current is sensed by means of current sense transformers.

* * * * *